United States Patent
Council, III

(10) Patent No.: US 9,289,806 B2
(45) Date of Patent: Mar. 22, 2016

(54) SOIL GAS SYSTEM AND METHOD

(71) Applicant: Edward Augustus Council, III, Xenia, OH (US)

(72) Inventor: Edward Augustus Council, III, Xenia, OH (US)

(*) Notice: Subject to any disclaimer, the term of this patent is extended or adjusted under 35 U.S.C. 154(b) by 0 days.

(21) Appl. No.: 14/314,236

(22) Filed: Jun. 25, 2014

(65) Prior Publication Data

US 2015/0375280 A1    Dec. 31, 2015

(51) Int. Cl.
*B09C 1/00*   (2006.01)
*B09C 1/10*   (2006.01)

(52) U.S. Cl.
CPC . *B09C 1/005* (2013.01); *B09C 1/10* (2013.01); *B09C 2101/00* (2013.01)

(58) Field of Classification Search
USPC ......... 405/128.1, 128.15, 128.2, 129.1, 258.1
See application file for complete search history.

(56) References Cited

U.S. PATENT DOCUMENTS

| 4,765,902 A | 8/1988 | Ely et al. | |
|---|---|---|---|
| 5,106,232 A | 4/1992 | Metzer et al. | |
| 5,464,309 A * | 11/1995 | Mancini | B09C 1/005 166/236 |
| 6,250,237 B1 * | 6/2001 | Licht | B09C 1/002 111/200 |
| 2003/0129735 A1 * | 7/2003 | Moorhead | B09C 1/002 435/262.5 |

OTHER PUBLICATIONS

Kamath et al.; Enhanced Attenuation Technologies: Passive Soil Vapor Extraction; Aug. 2009.*

* cited by examiner

*Primary Examiner* — Sean Andrish
(74) *Attorney, Agent, or Firm* — Ancel W. Lewis, Jr.

(57) ABSTRACT

A system for intercepting, treating and venting of soil gas from contaminated soil includes a borehole with an open top end, a porous liner against the outer wall of the borehole and porous fill material inside the liner. The fill material can include materials to retard and degrade contaminants in the soil gas. The system can include a slotted aeration tube in the borehole, vegetation planted in the open end of the borehole, impermeable sections in liner, and impermeable ground cover around the top end of the borehole. A method for intercepting, treating and venting of soil gas from contaminated soil includes the system and pulling soil gas out the top end of the borehole with variations in atmospheric barometric pressure.

19 Claims, 1 Drawing Sheet

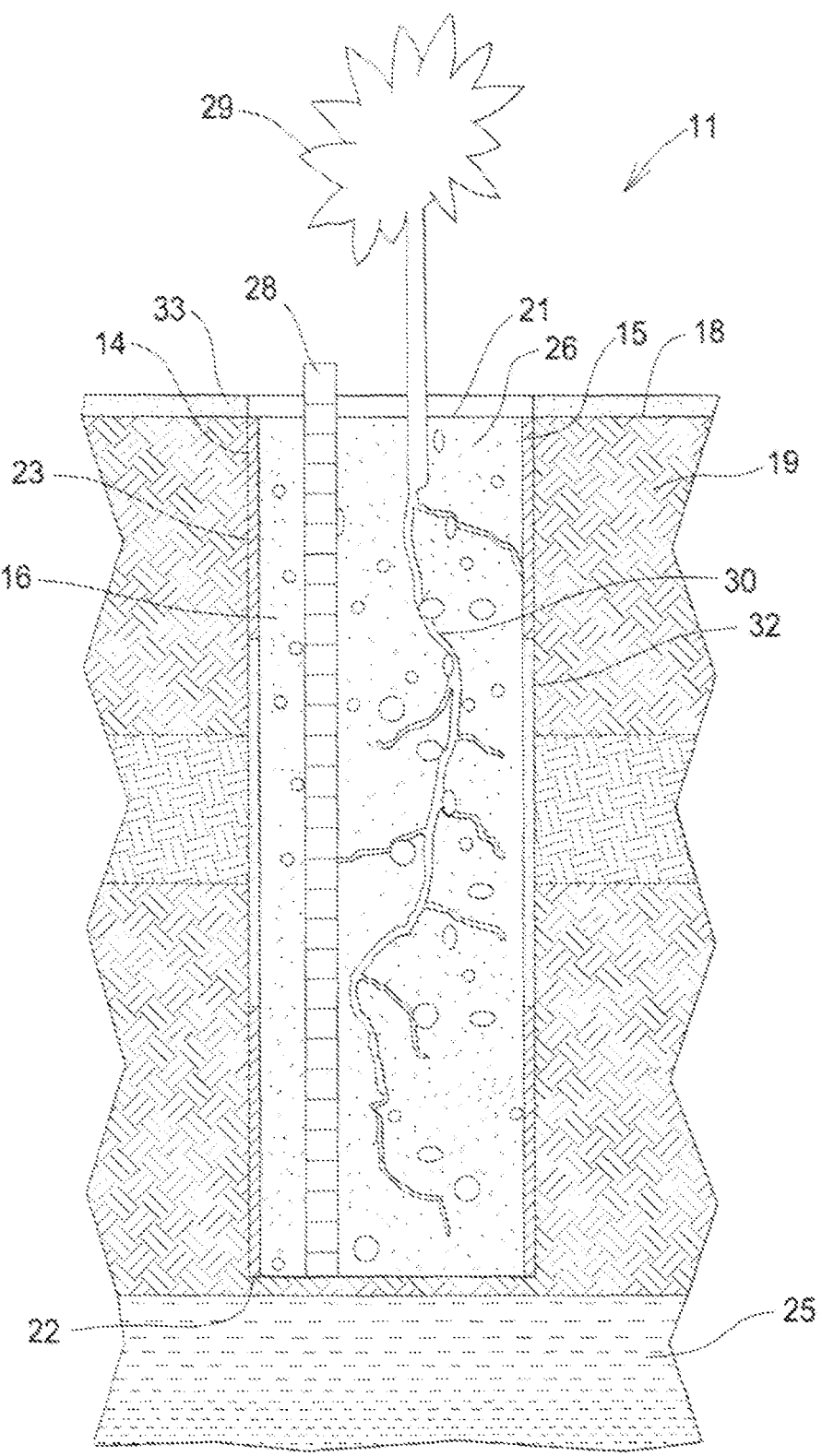

SOIL GAS SYSTEM AND METHOD

TECHNICAL FIELD

The present invention relates to soil remediation, and more particularly to a passive system and method for intercepting, treating and venting soil gas from contaminated soil.

BACKGROUND ART

Soil gas contamination related to volatile organic and inorganic materials is common and can cause serious harm to people, other animals and plants. The United States spends billions of dollars each year treating soil gas contamination. Sources of soil gas contamination include leaking underground storage tanks, dry cleaners, leaking pipeline, chemical spills, landfills and transportation mishaps.

The vadose zone, between the ground surface and the water table, generally consists of subsurface sediments that were deposited in substantially horizontal layers. Soil gases exist in the subsurface layers often at pressures slightly higher than atmospheric pressure due to microbial respiration, physiochemical influences on contaminants, periodic decreases in barometric pressure, and increases in the partial pressure of organic compounds. Porosity varies from layer to layer, and some layers are impermeable, so that the conductivity of fluids is significantly greater horizontally than vertically. Impermeable surface covers, such as a concrete barrier, will also prevent upward migration of soil gas.

Soil Vapor Extraction (SVE) is one known method for treating soil gas contamination in the vadose zone. SVE systems can include injection wells with blowers that push air down the injection wells, spaced extraction wells with pumps that pull soil vapor and air out of the extraction wells, and air/water separators connected to the pumps. Soil vapor in porous subsurface layers migrates from higher pressure zones to lower pressure zones, so that the soil gas migrates horizontally into the extraction wells.

The injection and extraction wells in SVE systems are generally engineered wells in order to efficiently utilize the blowers and pumps. These engineered wells have a casing in a borehole. The casing has a smaller diameter than the borehole, and extends from the bottom of the borehole to a few feet above the ground level. The casing has a screen section that extends upwardly a selected distance from the bottom end. The well has porous fill material between the casing and the borehole wall from the bottom end up to slightly above the screen section, and a substantially impermeable material filling the space between the casing and the borehole wall from the porous fill material to the ground level, so that soil gas can only travel up the inside of the casing.

Installation of the injection and extraction wells for SVE systems can be relatively expensive. Power to run the blowers and pumps can be a major cost for SVE systems. Maintenance of the blowers and pumps adds to the ongoing costs of SVE systems. Regulatory requirements in many states require these engineered wells be removed after the wells are no longer in use, adding additional cost.

Passive Soil Vapor Extraction (PSVE) systems eliminate the use of conventional power sources to power the blowers and pumps. One known type of PSVE system uses wind or solar power to power the blowers and pumps. The second known type of PSVE system uses one way valves on the injection and extraction wells, and relies on variations in atmospheric barometric pressure to extract soil vapors. Both types of PSVE system use engineered wells with the same costs for construction, maintenance and removal costs.

Although the pressure required to open the one way valves used in the second type of PSVE system is very low, the required pressure is still generally greater than normal diurnal barometric variations, so that these valves will only open during meteorological low pressure events. The one way valves used in the second type of PSVE system are prone to sticking due to insects, dirt, ice, or other materials, and therefore require maintenance.

The vadose zone has lots of small scale porous intervals, especially closer to the ground surface. The engineered wells in the known SVE and PSVE systems can treat only the single zone adjacent to the screen section at the bottom of the casing. The engineered wells in the known SVE and PSVE systems project above the ground layer and are therefore limited in location.

DISCLOSURE OF THE INVENTION

A system for intercepting, treating and venting of soil gas from contaminated soil includes a least one borehole, a gas permeable liner, and porous fill material. The borehole has an inwardly facing outer wall of the soil and a top end open to the atmosphere above said ground level to allow unimpeded flow of gases, defines a borehole cavity. The liner is in borehole against the outer wall and around the borehole cavity. The liner prevents migration of fine grain particles from the soil into the borehole cavity. The fill material fills the borehole cavity and has a porosity significantly greater than the soil. The fill material can include materials to retard and degrade contaminants in the soil gas such as organic carbon, reactive iron and nutrients for microbial activity. The system can also include a hollow, slotted aeration tube with a diameter smaller than the borehole that extends through said fill material from the top end towards the bottom end of the borehole. Vegetation can be planted in the fill material at the top end of the borehole reduce compaction and maintain porosity of the fill material. Variations in atmospheric barometric pressure pull soil gas from the soil to the borehole cavity and out the open top end of the borehole. The system can also include a ground cover of low permeability material around the top end of the borehole. A method for intercepting, treating and venting of soil gas from contaminated soil includes the steps of providing the system described above and pulling soil gas from the soil to the borehole cavity and out the top end of the borehole with variations in atmospheric barometric pressure.

BRIEF DESCRIPTION OF THE DRAWINGS

Details of this invention are described in connection with the accompanying drawings that bear similar reference numerals in which:

The FIGURE is a schematic side elevation view of a system embodying features of the present invention.

DETAILED DESCRIPTION OF THE INVENTION

Referring to the FIGURE, a system 11 for intercepting, treating and venting soil gas from contaminated soil, embodying features of the present invention, includes one or more spaced boreholes 14 each having a liner 15 and fill material 16. Each borehole 14 is drilled from ground level 18 downwardly to a selected depth through the soil 19. The borehole 14 has an open top end 21 at ground level 18, a spaced bottom end 22, and an inwardly facing outer wall 23 of the soil 19 that extends from the top end 21 to the bottom end 22. Preferably the bottom end 22 is above the water table 25. The borehole 14 defines a borehole cavity 26.

The liner 15 fits into the borehole 14 adjacent to the outer wall 23, and extends from the top end 21 to the bottom end 22. The liner 15 is gas permeable and can be made from organic or inorganic mesh. The liner 15 reduces and prevents fine grain particles in the soil 19 migrating into the borehole cavity 26. The liner 15 can include one or more gas impermeable sections 32 at selected depths to prevent seepage of water and other substances from specific layers in the soil 19.

The borehole cavity 26, inside the liner 15, is filled to the top end 21 of the borehole 14 with the fill material 16. The fill material 16 is porous to allow the free flow of soil gas into and up the borehole cavity 26. The fill material 16 is preferably sand or gravel consisting of particles within a well-defined size range. The uniform size of the particles in the fill material 16 prevents compaction and maintains porosity in the borehole cavity 26. Preferably, the fill material has a porosity an order of magnitude greater than the porosity of the surrounding soil 19.

The fill material 16 prevents collapse of the borehole 14 and keeps the borehole 14 open to gas movement. The fill material 16 allows the soil gas and air to exist at barometric pressure levels throughout the entire length of the borehole 14. The fill material 16 allows the unimpeded migration of soil gases at higher pressure up the borehole 14 to the ground level 18 when favorable barometric conditions exist.

Materials capable of retarding and/or degrading contaminants in the soil gas can be added to the fill material 16 to selectively remediate the contaminants as the soil gas moves up the borehole 14 to ground level 18. The materials for retarding and/or degrading contaminants in the soil gas can include one or all of organic carbon, reactive iron and nutrients for microbial activity.

The system 11 can include a slotted aeration tube 28 having a diameter smaller than the diameter of the borehole 14. The tube 28 extends downwardly through the fill material 16 from the top end 21 to the bottom end 22 of the borehole 14. The tube 28 aids the transfer of soil gas into the atmosphere from the entire length of the borehole 14.

The system 11 can include vegetation 29 planted in the fill material 16 at the top end 21 of the borehole 14. The roots 30 of the vegetation 29 extend downwardly into the fill material 16. The roots 30 reduce settling and compaction of the fill material 16, and thereby maintain the permeability and porosity of the fill material 16.

The liner 15 can include one or more gas impermeable sections 32 at selected depths. The gas impermeable sections 32 prevent groundwater and other liquids from migrating into the borehole 14 from saturated layers or interval in the otherwise unsaturated vadose zone. The system 11 can include ground cover 33 around the top end 21 of the borehole 14 on top of the soil 19 at ground level 18. The ground cover 33 is made from a material of low permeability, such as bentonite clay, concrete or a geosynthetic liner. The ground cover 33 traps soil gas in the shallow subsurface soil 19, and allows the soil gas pressure to increase above barometric pressure levels.

A method for intercepting, treating and venting soil gas from contaminated soil, embodying features of the present invention, includes the steps of providing the system 11, as described above, and pulling the soil gas from the soil 19 to the borehole cavity 26 and out the top end 21 of the borehole 14 with variations in atmospheric barometric pressure. More specifically the method includes the steps of providing at least one borehole 14, installing a gas permeable liner 15 in the borehole 14, filling a borehole cavity 26 inside the liner 15 with porous fill material 16, and pulling the soil gas from the soil 19 to the borehole cavity 26 and out the top end 21 of the borehole 14 with variations in atmospheric barometric pressure. The borehole 14 has a top end 21 at the ground level 18, a spaced bottom end 22 above the water table 25 and an inwardly facing outer wall 23 of soil 19 extending downwardly from the top end 21 to the bottom end 22. The borehole 14 defines the borehole cavity 26. The top end 21 is open to atmosphere above the ground level 18 to allow unimpeded flow of gases. The liner 15 is installed in the borehole 14 against the outer wall 23, around the borehole cavity 26 from the top end 21 to the bottom end 22 to reduce and prevent fine grain particles in the soil 19 migrating into the borehole cavity 26.

The method can also include the steps of providing a hollow, slotted aeration tube 28 having a diameter smaller than the borehole 14 with the tube 28 extending through the fill material 16 from the top end 21 towards the bottom end 22 of the borehole 14, planting vegetation 29 in the fill material 16 at the top end 21 of the borehole 14 with roots 30 extending downwardly to reduce compaction and maintain porosity of the fill material 16, and providing a ground cover 33 of low permeability material around the top end 21 of the borehole 14, at ground level 18, over the soil 19.

The fill material 16 can include materials capable of retarding and/or degrading contaminants in the soil gas to selectively remediate the contaminants such as organic carbon, reactive iron and/or nutrients for microbial activity. The fill material 16 can have a porosity at least an order of magnitude greater than the soil 19. The liner 15 can have at least one gas impermeable section 32 at a selected depth.

The cost to construct the system 11 is significantly less than the cost to construct the engineered wells of the known SVE and PSVE systems. The system 11 eliminates operating costs associated with the known SVE systems. The system 11 eliminates the maintenance costs associated with the known SVE and PSVE systems. The system 11 does not need to be removed when use of the system 11 stops, eliminating the removal costs associated with the wells in known SVE and PSVE systems.

The system 11 vents soil gas from layers along the whole extent of the borehole 14, as compared to the engineered wells in known SVE and PSVE systems that only vent soil gas from a small interval near the bottom. The system 11 can be built flush with the ground level 18 and therefore can be located almost anywhere, including areas prone to vehicle and pedestrian traffic. The engineered wells in known SVE and PSVE systems project above the ground, would be damaged by vehicle traffic, and would present a tripping hazard for pedestrian traffic.

Although the present invention has been described with a certain degree of particularity, it is understood that the present disclosure has been made by way of example and that changes in details of structure may be made without departing from the spirit thereof.

What is claimed is:

1. A system for intercepting, treating and venting of soil gas from contaminated soil in a vadose zone that extends downwardly from a ground level to a water table, comprising:

at least one borehole with a top end at said ground level, a spaced bottom end above said water table and an inwardly facing outer wall of said soil extending downwardly from said top end to said bottom end, said borehole defining a borehole cavity, said top end being open to atmosphere above said ground level to allow unimpeded flow of gases, a gas permeable liner in said borehole against said outer wall and around said borehole cavity from said top end to said bottom end to reduce and prevent fine grain particles in said soil migrating into said borehole cavity, and porous fill material inside said liner and filling said borehole cavity, whereby variations in atmospheric barometric pressure pull said soil gas from said soil to said borehole cavity and out said top end of said borehole.

2. The system as set forth in claim 1:

wherein said borehole has a diameter, and including a hollow, slotted aeration tube having a diameter smaller than said diameter of said borehole, said tube extending through said fill material from said top end towards said bottom end of said borehole.

3. The system as set forth in claim 2 wherein said tube extends to said bottom end.

4. The system as set forth in claim 1 wherein said soil has a porosity and said fill material has a porosity at least an order of magnitude greater than said porosity of said soil.

5. The system as set forth in claim 1 wherein said fill material includes materials to retard and degrade contaminants in said soil gas.

6. The system as set forth in claim 1 wherein said fill material includes at least one of organic carbon, reactive iron and nutrients for microbial activity.

7. The system as set forth in claim 1 including vegetation planted in said fill material at said top end of said borehole with roots extending downwardly to reduce compaction and maintain porosity of said fill material.

8. The system as set forth in claim 1 wherein said liner has at least one gas impermeable section at a selected depth.

9. The system as set forth in claim 1 including a ground cover of low permeability material around said top end of said borehole, at said ground level over said soil.

10. A system for intercepting, treating and venting of soil gas from contaminated soil in a vadose zone that extends downwardly from a ground level to a water table, said soil having a porosity, comprising:

at least one borehole with a top end at said ground level, a spaced bottom end above said water table and an inwardly facing outer wall of said soil extending downwardly from said top end to said bottom end, said borehole defining a borehole cavity, said top end being open to atmosphere above said ground level to allow unimpeded flow of gases, said borehole having a diameter, a gas permeable liner in said borehole against said outer wall and around said borehole cavity from said top end to said bottom end to reduce and prevent fine grain particles in said soil migrating into said borehole cavity, porous fill material inside said liner and filling said borehole cavity, said fill material having a porosity at least an order of magnitude greater than said porosity of said soil, said fill material including materials to retard and degrade contaminants in said soil gas, said fill material including at least one of organic carbon, reactive iron and nutrients for microbial activity and a hollow, slotted aeration tube having a diameter smaller than said diameter of said borehole, said tube extending through said fill material from said top end towards said bottom end of said borehole, whereby variations in atmospheric barometric pressure pull said soil gas from said soil to said borehole cavity and out said top end of said borehole.

11. A method for intercepting, treating and venting of soil gas from contaminated soil in a vadose zone that extends downwardly from a ground level to a water table, said soil having a porosity, comprising the steps of:

providing a least one borehole with a top end at said ground level, a spaced bottom end above said water table and an inwardly facing outer wall of said soil extending downwardly from said top end to said bottom end, said borehole defining a borehole cavity, said top end being open to atmosphere above said ground level to allow unimpeded flow of gases, said borehole having a diameter, installing a gas permeable liner in said borehole against said outer wall and around said borehole cavity from said top end to said bottom end to reduce and prevent fine grain particles in said soil migrating into said borehole cavity, and filing said borehole cavity inside said liner with porous fill material, and, pulling said soil gas from said soil to said borehole cavity and out said top end of said borehole with variations in atmospheric barometric pressure.

12. The method as set forth in claim 11 including the step of providing a hollow, slotted aeration tube having a diameter smaller than said diameter of said borehole, said tube extending through said fill material from said top end towards said bottom end of said borehole.

13. The method as set forth in claim 12 wherein said tube extends to said bottom end.

14. The method as set forth in claim 11 wherein said fill material has a porosity at least an order of magnitude greater than said porosity of said soil.

15. The method as set forth in claim 11 including the step of retarding and degrading contaminants in said soil gas with materials in said fill material.

16. The method as set forth in claim 11 wherein said fill material includes at least one of organic carbon, reactive iron and nutrients for microbial activity.

17. The method as set forth in claim 11 including the step of planting vegetation in said fill material at said top end of said borehole with roots extending downwardly to reduce compaction and maintain porosity of said fill material.

18. The method as set forth in claim 11 wherein said liner has at least one gas impermeable section at a selected depth.

19. The method as set forth in claim 11 including the step of providing a ground cover of low permeability material around said top end of said borehole, at said ground level, over said soil.

\* \* \* \* \*